United States Patent [19]

Johnson

[11] Patent Number: 4,919,805

[45] Date of Patent: Apr. 24, 1990

[54] VERTICAL LEAF FILTER FLUSH

[76] Inventor: Willard L. Johnson, 12923 Lincoln Ave., Huntington Woods, Mich. 48070

[21] Appl. No.: 202,149

[22] Filed: Jun. 3, 1988

Related U.S. Application Data

[62] Division of Ser. No. 932,010, Nov. 26, 1986, Pat. No. 4,790,935.

[51] Int. Cl.$^5$ .............................................. B01D 29/32
[52] U.S. Cl. ..................................... 210/332; 210/346; 210/409; 210/420; 210/416.1; 210/486
[58] Field of Search .................... 210/232, 323.1, 331, 210/340, 346, 486, 416.1, 332, 409, 420

[56] References Cited

U.S. PATENT DOCUMENTS

| | | | |
|---|---|---|---|
| 2,013,776 | 9/1935 | Wiesman | 210/182 |
| 2,061,351 | 11/1936 | Denhard | 210/486 |
| 2,104,473 | 1/1938 | Watson | 210/486 |
| 2,381,453 | 8/1945 | Hunziker | 210/323.1 |
| 2,551,312 | 5/1951 | Bokich | 210/346 |
| 2,552,305 | 5/1951 | Benedict | 210/346 |
| 2,555,724 | 6/1951 | Woody et al. | 210/346 |
| 2,691,445 | 10/1954 | Eichimeyer | 210/346 |
| 2,821,305 | 1/1958 | Anderson | 210/486 |
| 3,056,504 | 10/1962 | La Vallée | 210/346 |
| 3,339,742 | 9/1967 | Kracklauer | 210/232 |
| 3,559,809 | 2/1971 | Barmore | 210/333 |
| 3,623,614 | 11/1971 | Schmidt, Jr. | 210/486 |
| 3,635,343 | 1/1972 | Holland | 210/104 |
| 4,057,501 | 11/1977 | Müller | 210/346 |
| 4,116,838 | 9/1978 | Lazzaratta | 210/346 |
| 4,519,903 | 5/1985 | Johnson | 210/94 |
| 4,579,656 | 4/1986 | Johnson | 210/234 |

FOREIGN PATENT DOCUMENTS

| | | |
|---|---|---|
| 475091 | 11/1937 | United Kingdom . |
| 1032123 | 6/1966 | United Kingdom . |
| 1058349 | 2/1967 | United Kingdom . |
| 1366153 | 9/1974 | United Kingdom . |
| 2094653 | 9/1982 | United Kingdom . |

Primary Examiner—Richard V. Fisher
Assistant Examiner—Wanda L. Millard
Attorney, Agent, or Firm—Basile and Hanlon

[57] ABSTRACT

A system for continuously or periodically flushing collected particles from filter leaf assemblies without interrupting the filtering operation is disclosed. The filter leaf assemblies are constructed from a pair of like grid-like filter media support panels mounted in spaced parallel relationship within a rigid rectangular peripheral frame. Sheets of filter media overlie the outer surfaces of the support panels and are fixedly sealed to the frame around the entire periphery of the panel. One side of the frame is fixedly mounted to an outlet pipe whose interior communicates with the space between the support panels via mating slots in the pipe wall and frame. Two filter media attachment arrangements and two frame to pipe mounting arrangements are disclosed.

5 Claims, 4 Drawing Sheets

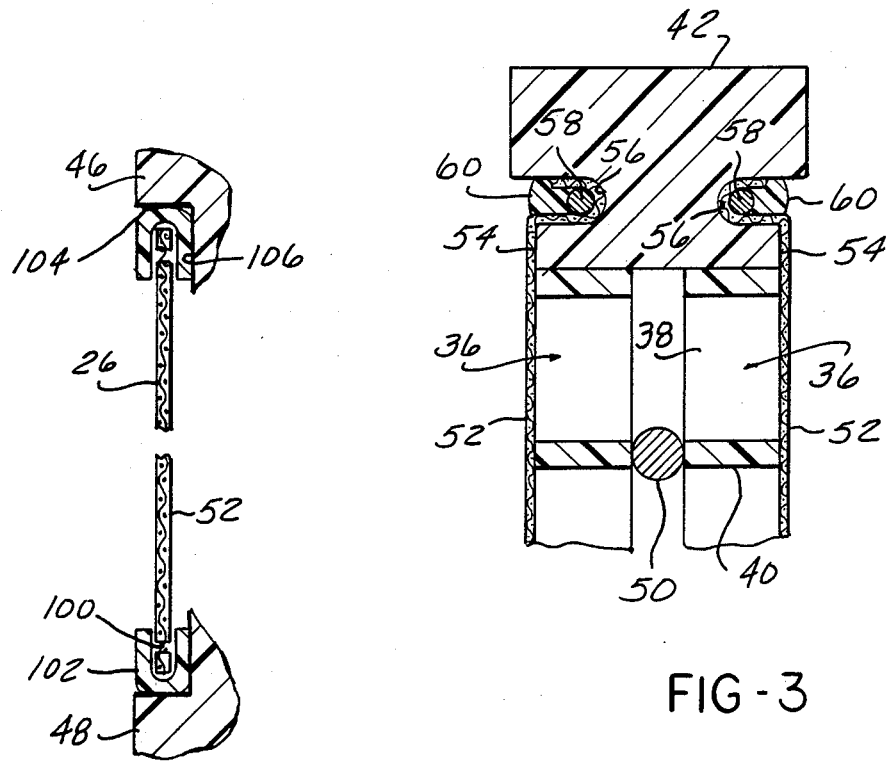
FIG-9
FIG-3
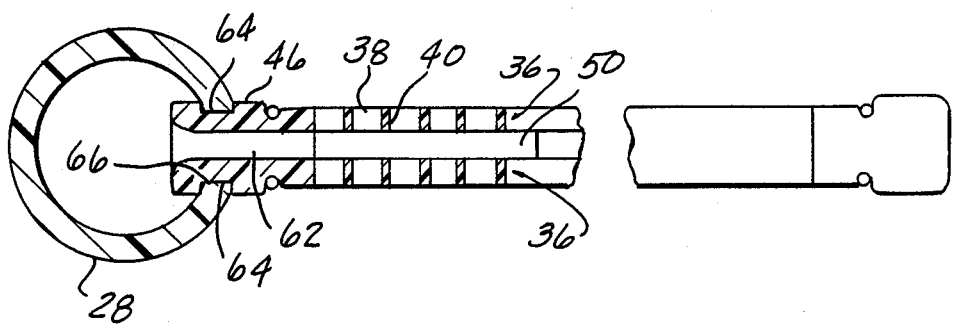
FIG-4

VERTICAL LEAF FILTER FLUSH

This application is a division, of application Ser. No. 932,010, filed Nov. 26, 1986, which issued (12/13/88) as U.S. Pat. No. 4,790,935.

BACKGROUND OF THE INVENTION

In my U.S. Pat. Nos. 4,519,903 and 4,579,656 there are disclosed various forms of leaf type filtering apparatus especially adapted to filtering, in a relatively compact apparatus, large volumes of liquids to remove contaminant particles from the liquids.

My prior patents disclose apparatus in which a plurality of individual generally rectangular filter leaf assemblies are located in spaced parallel relationship to each other within a tank into which fluid to be filtered is continuously fed. The individual leaf assemblies include a generally rectangular filter media support grid or core formed of intersecting longitudinally extending and transversely extending webs, with the panel being fixedly mounted along one side in the wall of an outlet pipe. A bag-like filter element enshrouds the panel and pipe.

In order that fluid flowing through the filter element into the cell-like grids between the webs of panels can be conducted to the outlet pipe, it is necessary that flow passages be formed through the individual webs so that the fluid can flow from one cell to the next and eventually be discharged into the outlet pipe.

In the leaf assemblies disclosed in my two above referred to patents, the grid-like panels, as received from their manufacturer, have no openings through their webs. To form these openings, two grid panels as received from the manufacturer are required to form a single filter leaf panel. Slots are cut from one side of each panel into all of the webs and the two panels are then bonded to each other with the slotted sides of the webs in face to face engagement with each other. When so assembled, the slots in the webs define the opeings or flow passages between adjacent cells. While the slotting and bonding of the panels is not an especially difficult or complex process it represents a substantial percentage of the cost of the completed panel.

As disclosed in my aforementioned patents, the grid-like panels are fixedly mounted upon their respective outlet pipes by forming a panel receiving slot in the wall of the pipe through which the panel projects. The pipes and panels are formed of a synthetic plastic material which is readily joined by a bonding process, however, the thickness of the panel webs is quite small and in order to achieve an adequate bonding area between the panel and pipe, it was necessary to project the panel edge across the entire interior passage of the pipe so that one longitudinal edge of the panel could be bonded to the inner wall of the pipe. This requirement not only complicates the assembly operation, but also results in an unwanted obstruction to flow through the pipe.

Further, the enclosing or enshrouding of the panel with the filter media requires the performance of at least some sewing and sealing operations on the media after is has been initially positioned on the assembled pipe and panel. The enshrouding requirements restricts the choice of filter media to material which is flexible and capable of being sealingly seamed in place by manually manipulate tools.

The present invention is directed to filter leaf assemblies which overcome the problems referred to above, as well as others.

SUMMARY OF THE INVENTION

In accordance with the present invention, a filter leaf assembly includes a pair of rectangular grid-like panels formed by intersecting longitudinal and transverse webs. These panels are fixedly mounted in parallel spaced relationship to each other within a rigid rectangular frame extending around the periphery of the grid-like panels. The individual cells of the grid-like panels are all in direct fluid communication with each other via the space between the two assembled panels. This spacing may be established and maintained by short spacer members engaged and bonded to the opposed faces of the two panels.

One of the sides of the rectangular frame is formed with an elongate slot extending entirely through the frame member in communication with the space between the grid-like panels. This particular side of the rectangular frame is bonded to the wall of an outlet pipe formed with an axial slot through the pipe wall in communication with the slot in the frame member. Two arrangements for mounting the frame upon the outlet pipe are described in detail below.

The rectangular frame described above is formed with a flat bottomed recess of uniform width and depth which extends around two opposed sides of the frame along the inner periphery of the frame. The outer surfaces of the grid-like panels are mounted to the frame so that the outer surfaces are flush or coplanar with the bottom of the recess. A sheet of filter media overlies the outer surface of each grid-like panel and is sealed around its entire periphery to the flat bottom surface of the recess in the frame members. Two exemplary arrangements for so mounting the filter media upon the frame are described in detail below.

The depth of the recesses is selected to be greater than the thickness of the filter media panel which is mounted in and sealed within the recess. This enables the leafs, consisting of the peripheral frame, grid-like core panels and assembled filter media to be stacked in face-to-face relationship for shipment or storage with the media held out of contact with the grid like core as well as the media of the adjacent leaf.

Other objects and features of the invention will become apparent by reference to the following specification and to the drawings.

IN THE DRAWINGS

FIG. 3 is a detail cross sectional view of a filter leaf assembly taken on line 3—3 of FIG. 2;

FIG. 4 is a detail cross sectional view of a portion of a filter leaf assembly taken on line 4—4 of FIG. 2;

FIG. 9 is an enlarged cross sectional view of the edge of the membrane.

Figure 1:
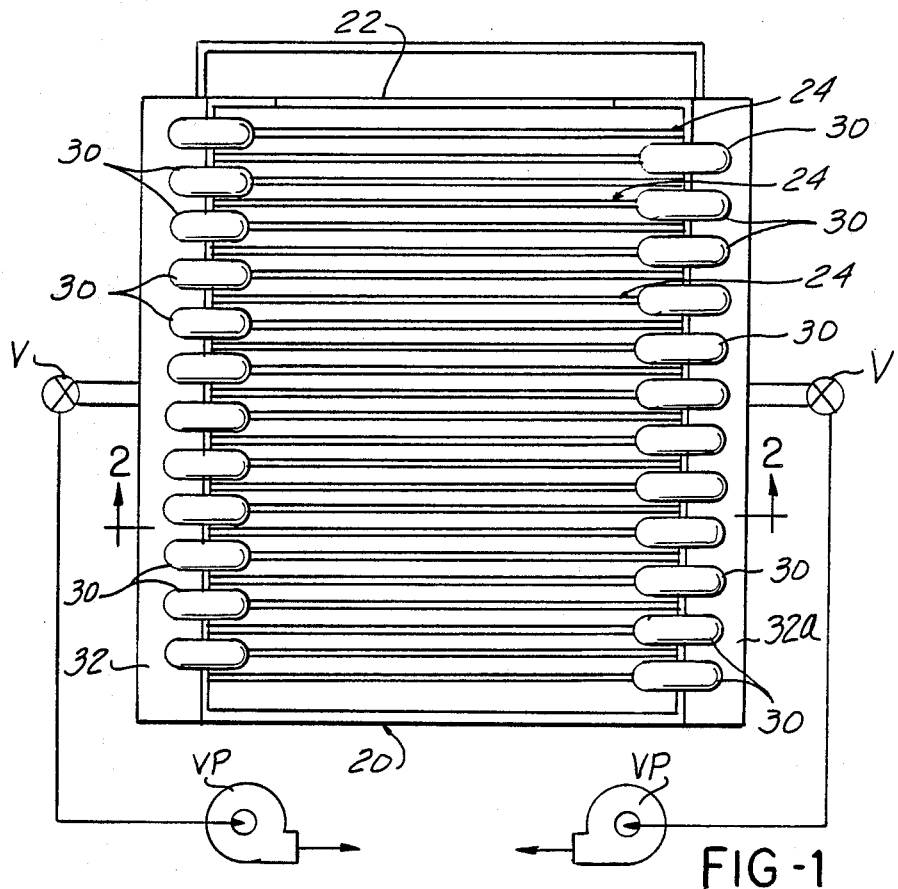
FIG. 1 is a top plan view of one form of filter apparatus employing filter leaf assemblies embodying the present invention.
Figure 2:
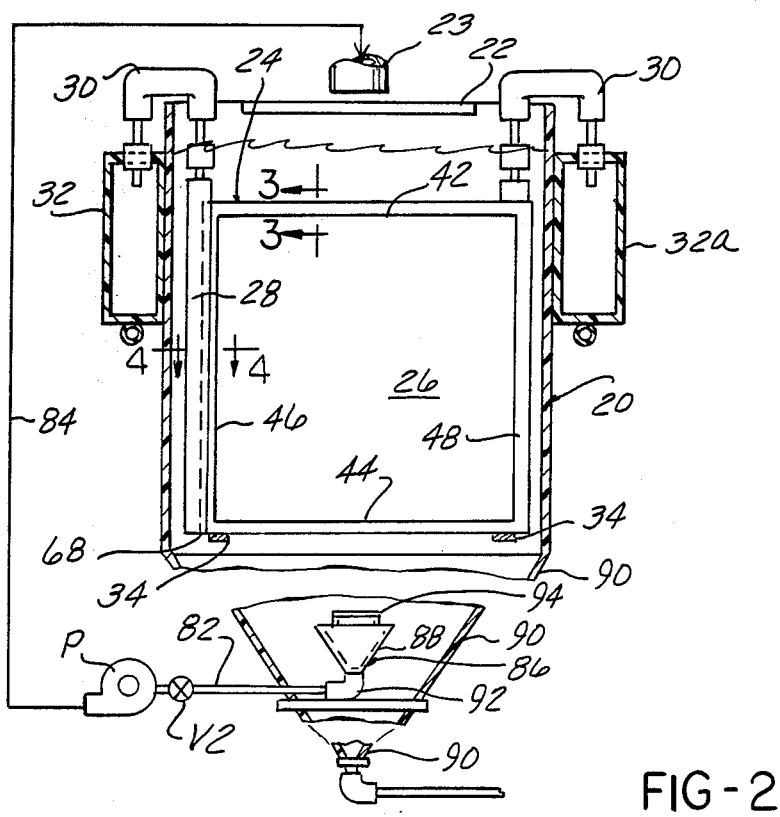
FIG. 2 is a cross sectional view taken on line 2—2 of FIG. 1.

Referring first to FIGS. 1 and 2, a filtering apparatus similar in several respects to that disclosed in my patent 4,579,656 includes a generally rectangular open topped tank designated generally 20 into which fluid to be filtered is continuously fed either via an overflow weir 22 or an inlet pipe 23 (FIG. 2). Submerged within the contaminated fluid contained in tank 20 are a plurality of individual filter leaf assemblies designated generally 24.

Each filter leaf assembly 24 includes a generally rectangular panel-like filter leaf 26 (FIG. 2) which is mounted, along one vertical edge, on an outlet pipe 28. As will be described in greater detail below, the opposed sides of leaf 26 are covered with a filter media through which fluid from tank 20 flows into the interior of the leaf. The filter media separates the contaminant particles from the fluid. Clean fluid in the interior of leaf 26 is conducted into outlet pipe 28, thence upwardly through a U-shaped coupling assembly 30 into the interior of one of two closed manifolds 32, 32a which are in turn connected (see FIG. 1) via valves V to the intakes of vacuum pumps VP. The pumps VP establish a pressure differential operable to induce a continuous flow of fluid from outlet pipes 28 through the manifolds 32,32A to be discharged from the pumps VP.

As best seen in FIG. 1, the leaf assemblies 24 are arranged with the outlet pipes 28 of adjacent leafs being located at opposite sides of tank 20. Thus, half of the leafs are connected to manifold 32, while the remaining leafs are in fluid communication with manifold 32a. Thus, one manifold at a time may be shut down to permit replacement or cleaning of the leafs connected to that manifold while the leafs connected to the opposite manifold remain in operation.

As explained in greater detail in my patent 4,579,658, the U-shaped couplings 30 have a sliding sealing fit with their associated outlet tube 28 and manifold, and may be removed simply by lifting the coupling vertically to disconnect the coupling. The leaf assembly may then be lifted vertically out of the tank.

The outer diameter of outlet pipes 28 is greater than the thickness of the individual filter leafs, 26 and when located within tank 20, the distal end of one leaf projects between the outlet pipes of the two adjacent leafs to maintain the leafs in the desired laterally spaced relationship. The leafs are supported within the tank upon fixed frame members 34 (FIG. 2).

The construction of the individual filter leafs and their attachment to outlet pipes 28 is best seen in FIGS. 3-7, in which two embodiments of filter leafs are disclosed.

Each leaf 26 is made up of a pair of like perforate generally rectangular panels designated generally 36 which are of generally rectangular configuration and formed of intersecting horizontal webs 38 and vertical webs 40. The panels are molded as an integral body from any of several commercially available plastic materials. The ratio of the dimensions of the openings through the panels to the thickness of the webs is such that roughly 80 percent of the two foot square panel is open to accommodate the flow of fluid laterally through the panel.

Figure 7:
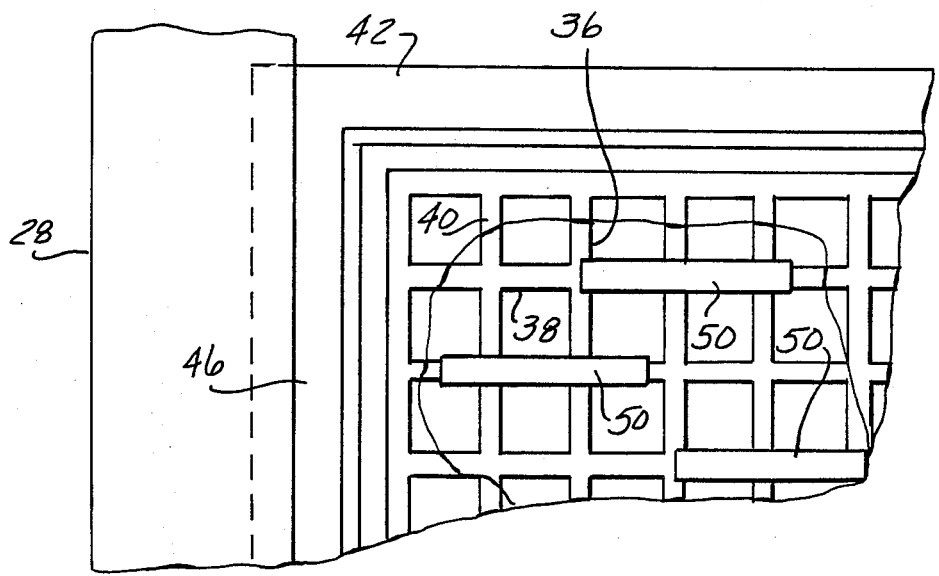
FIG. 7 is a partial side elevational view of a portion of a filter leaf assembly.

The panels 36 are fixedly mounted within a rigid rectangular peripheral frame made up of upper and lower frame members 42, 44 respectively fixedly secured at their opposite ends to vertically extending inner and outer frame members 46, 48 respectively. To establish and maintain the spacing between panels 36, spacer rods such as 50 may be bonded between the panels, as best shown in FIG. 3 at various locations. Panels 36 function as filter media support panels to prevent the inward collapse of the filter media 52 which during operation may have a pressure differential of about 10 psi exerted across it. For reasons which will become apparent below, the spacer rods 50 are all mounted in a horizontal position, as indicated in FIG. 7.

Referring now particularly to FIG. 3, it is seen that upper frame member 42 is formed with flat bottomed recesses 54 of uniform width and depth extending along opposed sides of frame member 42 along the inner edge of the frame member. Similar recesses 54 are formed in each of the remaining frame members 44, 46 and 48 so that recess 54 is effectively extended around the entire inner periphery of the rectangular frame defined by members 42, 44, 46 and 48 on opposite sides of the frame. From FIG. 3, it will be noted that the outer side surfaces of the grid-like filter media support panels 36 are flush with the bottom of recess 54 so that the filter media 52 extends smoothly from each panel 36 to lie against the bottom of recess 54.

In the embodiment of FIGS. 3 and 4, the filter media is fixedly secured in position in overlying relationship to the respective outer sides of panels 36 by forming grooves 56 in the respective recesses 54, depressing and mechanically trapping the media within groove 56 by means of a resilient "rope", 58 which may be of a suitable synthetic plastic material, and bonding the media and rope into the groove by a suitable adhesive or bonding material 60. Like recesses 54, the grooves 56 extend continuously around the entire rectangular frame, as does the rope and bonding material 60 so that a peripheral seal between the filter media 52 and the frame extends entirely around the periphery of the filter media support panels 36.

Referring now particularly to FIG. 4, inner side frame member 46 is formed with a passage 62 which extends through member 46 to communicate with the space between the grid-like panels 36. Passage 62 is elongated and extends over the major portion of the length of frame member 46, but terminates short of each of the opposite ends of member 46.

Member 46 is formed, at opposite sides, with opposed mounting grooves 64 which extend the entire length of member 46. Outlet pipe 28 is formed with an axially extending slot 66 which extends from one end of the pipe for a distance equal to the length of member 46. As best seen in FIG. 4, the width of slot 66 in the pipe wall is such that member 46 may be axially inserted into the slot 66 by aligning the grooves 64 with the opposed sides of slot 66. After the frame member 46 is fully seated in the slot 66, it is adhesively bonded in position and the end of pipe 28 from which member 46 was inserted is closed by a suitable closure cap 68 (FIG. 2) which is bonded into position to sealingly close that end of pipe 28. The opposite end of pipe 28 is left open to connect to the outlet of the filter.

Figure 5:
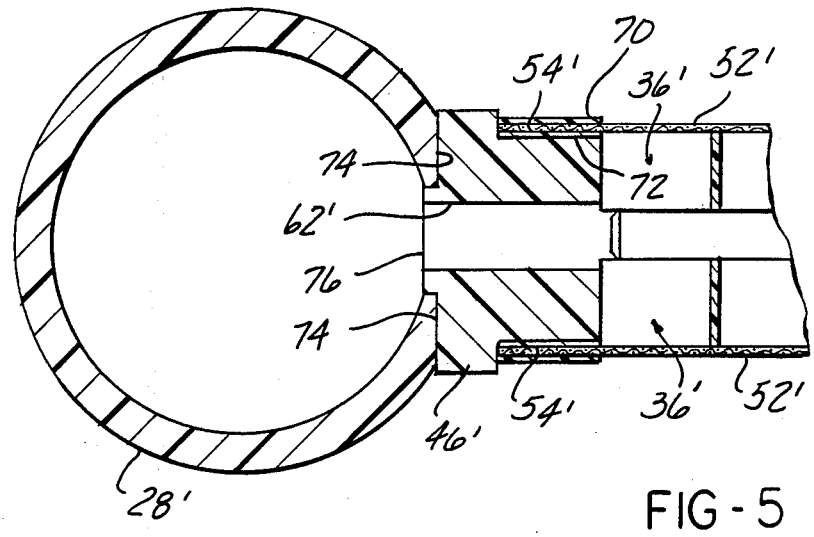
FIG. 5 is a detail cross sectional view, similar to FIG. 4, of a second embodiment of a filter leaf assembly.
Figure 6:
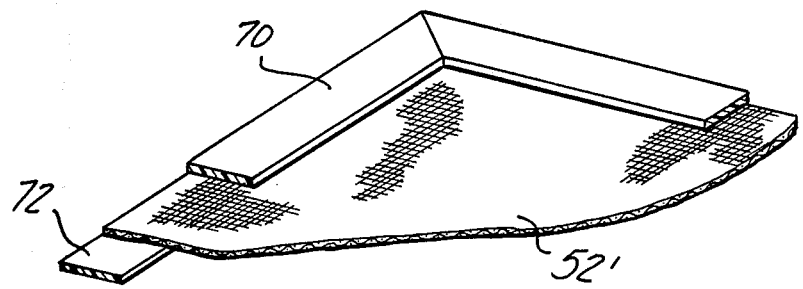
FIG. 6 is a perspective view, with certain portions broken away, of a filter media panel of the embodiment of FIG. 5.

A second embodiment of filter leaf assembly is shown in FIGS. 5 and 6. As in the embodiment of FIGS. 3 and 4, a pair of like grid-like filter media support panels 36' are fixedly mounted in spaced opposed parallel relationship within a rigid rectangular frame as in the embodiment of FIGS. 3 and 4. As in the previously described embodiment all of the various frame members are formed on their opposed sides with recesses 54', and the inner side frame member 46' is formed with an elongate passage 62' corresponding to the passage 62 of the previously described embodiment.

In the embodiment of FIGS. 5 and 6, the filter media 52' is sandwiched between pairs of strips 70, 72 of a reasonably stiff synthetic material, the strips 70 and 72 defining a rectangular frame around the periphery of the sheet of filter media 52' which is dimensioned to be fitted within and sealingly bonded in place in the recesses 54'.

The embodiment of FIGS. 5 and 6 also discloses a modified mounting arrangement for attaching frame member 46' to the outlet pipe 28'. As best seen in FIG. 5, a flat surface 74 is cut on one side of pipe 28' to a depth such that a slot 76 through the pipe wall is formed. The flattened outer side surface of inner side frame member 46' is then bonded directly to this flat surface 74 at opposite sides of slot 76 with the passage 62' through frame member 46' aligned with slot 76.

The alternative arrangements for mounting the filter media upon the frame permit substantially greater flexibility in the selection of the specific filter media. While some filter media is sufficiently flexible to be depressed into the grooves 56 of the FIG. 3 embodiment, other types of filter media may have mechanical characteristics such that the bonding of the filter media to a flat surface over a substantially increased area provided by the strips 70, 72 of the FIG. 6 embodiment may be preferably. It will be noted that in both embodiments, when the filter media is assembled into the leaf, the recesses 54 permit the media to be inset from the opposed side surfaces of the frame members so that assembled leafs, prior to assembly upon the outlet pipes, may be stacked in face-to-face relationship with each other without contact between the filter media of adjacent leafs.

Figure 8:
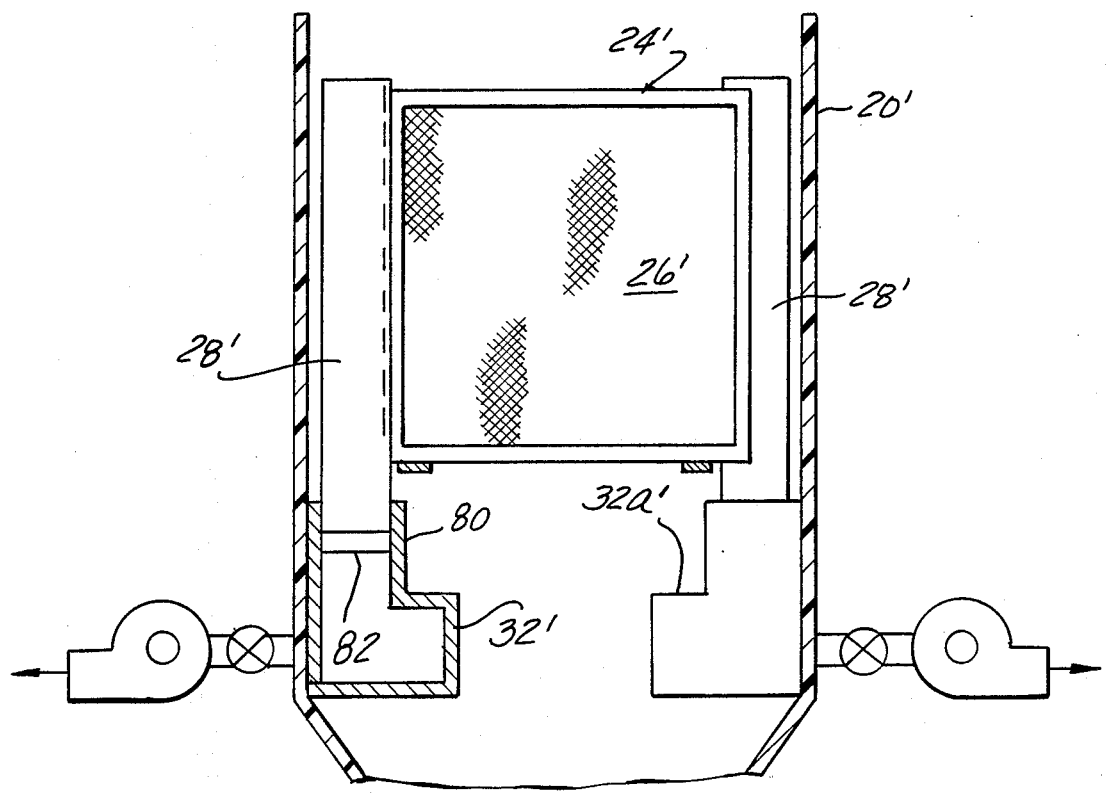
FIG. 8 is a cross sectional view, similar to FIG. 2, of a different form of filter apparatus employing filter leaf assemblies embodying the present invention.

In FIG. 8, there is shown in cross section an alternative form of filter apparatus, generally similar to that shown in my patent 4,519,903. In the apparatus of FIG. 8, the outlet manifolds 32', 32a' are located near the bottom of tank 20' and the outlet pipes 28' are open at their lower ends and inserted into individual coupling tubes 80 mounted in the top wall of the manifold. This particular arrangement requires a seal between the outlet pipe 28' and coupling tube 80 adequate to prevent unfiltered fluid within tank 20 from flowing past the seal into the manifold, while at the same time accommodating manual withdrawal of the pipe from coupling tube 80 when the filter leafs are to be removed for replacement. The filter apparatus of FIG. 8 is normally employed in usages where precoating of the filter media, as with diatomatious earth or other precoating or filter aid is required.

Because, as is apparent from FIG. 1, access to the coupling between the lower ends of outlet pipes 28' and coupling tubes 80 in the FIG. 8 embodiment is extremely restricted because of the close proximity of adjacent filter leafs, the seal between the lower end of outlet tubes 28' and coupling tubes 80 must have a sliding fit and yet provide a tight seal after being slipped into position. To provide such a seal, the lower end of outlet pipe 28 may be dipped into a melted rubber or other resilient thermo plastic material to a depth such that an annular band of the material of reasonably substantial axial extent is bonded or coated upon the lower end of pipe 28'. The surface of this coating may, if desired, be roughened. Although the coating will be abraded to some extent during its insertion into the coupling tube 80, the substantial axial extent of the annular band of coating will retain an adequate sealing area when the pipe is fully inserted. This seal normally will be augmented by precoating material which, during the precoating operation, will inherently be drawn to any point of leakage.

In many applications, clogging of the filter media resulting from the filtering operation will be corrected by a conventional backwashing, combined with periodic removal of contaminant particles which settle to the bottom of the tank by means of a sludge conveyor, not shown. However, backwashing requires an interruption in the filtering operation which is undesirable in large scale continuous operations, such as in municipal water treatment plants.

The close proximity of the filter leafs to each other presents the possibility of cross flow flushing collected particles from the surface of the filter media, without interrupting the filtering operation, by inducing an increased rate of downward flow of liquid through the spaces between adjacent filter leafs.

An arrangement for accomplishing this without interrupting the filtering operation is shown in FIG. 2 and takes the form of a pump P having an intake pipe 82 opening into the bottom of tank 20. The outlet of pump P is connected via a conduit 84 to the inlet of the tank so that when a valve V2 in intake pipe 82 is opened and pump P is driven, unfiltered fluid is drawn at a relatively high flow rate from a location in tank 20 below leafs 24 and returned to the top of tank 20 by the external circuit which includes conduit 84. Operation of pump P can thus induce a downward flow of contaminated fluid through tank 20 which will wash downwardly across the surfaces of leafs 24 to wash off particles which have been collected on the filter media.

In order to induce such a downward flow which is distributed over substantially the entire surface areas of the leafs, a flow distributing intake baffle designated generally 86 is mounted at the intake end of intake pipe 82. Baffle 86 takes the form of an upwardly and outwardly divergent funnel shaped housing 88 whose walls may be generally parallel to the downwardly and inwardly inclined lower walls 90 of tank 20. Housing 88 opens at its lower end into intake pipe 82 via a fitting 92 and is open at its upper end. A baffle plate 94 is fixedly mounted in housing 88 to block the central portion of the open upper end of the housing to establish the desired flow pattern. In that all of the fluid withdrawn by pump P from tank 20 is recirculated back into the tank, operation of pump P to induce a downward cross flow to flush the surfaces of the filter media has no practical effect upon the flow of contaminated fluid into the tank or the rate of flow of filtered fluid out of the tank. Thus, pump P may be operated continuously if desired or periodically as required.

In FIG. 9 their is illustrated a cross sectional view of the edge of the filter media 52 which may be a membrane material made from PTFE material. The media 52 is perforated along its longitudinal edge to form through bores 100. The edge of the media 52 is enclosed by a u-shaped plastic material 102 the interior surface of which is coated with an adhesive material which flows through the bore 100 to provide for a secure attachment of the material 102 to PTFE material. In the alternate embodiment a recess 104 is provided in the edges 42 to 48 and the member 52 is positioned therein and attached by a bonding agent 106.

While various embodiments of the invention have been described, it will be apparent to those skilled in the art that the disclosed embodiments may be modified. Therefore, the foregoing description is to be considered exemplary rather than limiting, and the true scope of the invention is that defined in the following claims.

I claim:

1. In a leaf filter apparatus including an open topped tank for receiving a continuous flow of contaminated liquid to be filtered, a plurality of panel-like filter leafs mounted within said tank in closely spaced adjacent parallel relation with said leafs disposed in vertical general planes, said leafs being operable to separate particles from said liquid by collecting said particles on the exterior surfaces of said leafs while passing said liquid into a filtrate discharge system;

the improvement comprising pump means operable to pump contaminated liquid from an intake in communication with the spaces between the filter leaves adjacent the bottom of said tank at a location below said filter leafs and to discharge said liquid back into the top of said tank to thereby induce an increased downward flow of liquid across the exterior surfaces of said filter leafs to flush collected particles therefrom toward the bottom of said tank while filtering.

2. The invention defined in claim 1 wherein said pump means includes intake means located in said tank for establishing an increased downward flow of liquid from substantially all regions of said tank upon operation of said pump means.

3. The apparatus of claim 1, wherein said pump means discharges liquid downward through spaces between adjacent filter leafs at an increase rate of flow for cross flow flushing collected particles from said exterior surfaces of said filter leafs disposed in vertical general planes.

4. The apparatus of claim 3, wherein said pump means draws liquid at a relatively high flow rate from said location in said tank below said filter leafs.

5. In a leaf filter apparatus including an open topped tank for receiving a flow of contaminated liquid to be filtered, a plurality of panel-like filter leaves mounted within said tank in closely spaced adjacent parallel relation with said leaves disposed in vertical general planes, said leaves being operable to separate particles from said liquid by collecting said particles on the exterior surfaces of said leaves while passing said liquid into a filtrate discharge system;

the improvement comprising pump means operable to pump contaminated liquid from the bottom of said tank at a location below said filter leaves and to discharge said liquid back into the top of said tank to thereby induce and increase downward flow of liquid across the exterior surfaces of said filter leaves to flush collected particles therefrom toward the bottom of said tank while filtering, intake means located adjacent the bottom of said tank for establishing an increase downward draw of liquid from substantially all regions of said tank upon operation of said pump means, wherein said pump means draws liquid at a relatively high flow rate through said intake means at a location in said tank below said filter leaves and discharges liquid downward through spaces between adjacent filter leaves at an increase rate of flow forming a cross flow stream for flushing collected particles from said exterior surfaces of said filter leaves while filtering.

* * * * *